(12) United States Patent
Singh

(10) Patent No.: US 12,039,218 B2
(45) Date of Patent: Jul. 16, 2024

(54) METHODS AND SYSTEMS FOR SHARING AN EXPERIENCE BETWEEN USERS

(71) Applicant: Rovi Guides, Inc., San Jose, CA (US)

(72) Inventor: Mona Singh, Cary, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/706,216

(22) Filed: Mar. 28, 2022

(65) Prior Publication Data

US 2023/0305790 A1  Sep. 28, 2023

(51) Int. Cl.
| | |
|---|---|
| *G06F 3/14* | (2006.01) |
| *G01C 21/36* | (2006.01) |
| *G06F 3/01* | (2006.01) |
| *G06V 10/74* | (2022.01) |
| *G06V 20/20* | (2022.01) |

(52) U.S. Cl.
CPC ....... *G06F 3/1454* (2013.01); *G01C 21/3623* (2013.01); *G06F 3/013* (2013.01); *G06V 10/761* (2022.01); *G06V 20/20* (2022.01)

(58) Field of Classification Search
CPC .................................................. G06T 19/006
See application file for complete search history.

(56) References Cited

U.S. PATENT DOCUMENTS

| 11,025,837 B2 | 6/2021 | Punja et al. | |
|---|---|---|---|
| 2014/0285519 A1* | 9/2014 | Uusitalo | H04W 4/80 |
| | | | 345/633 |
| 2017/0249754 A1* | 8/2017 | Fein | G06F 3/011 |
| 2019/0355153 A1* | 11/2019 | Singh | G06F 16/745 |

* cited by examiner

*Primary Examiner* — Shivang I Patel
(74) *Attorney, Agent, or Firm* — Haley Guiliano LLP

(57) ABSTRACT

Systems and methods are described for improved sharing of an experience between users. A first image captured using a first user device is received by control circuitry. A second image captured using a second user device is received by the control circuitry. Control circuitry determines a first set of elements of the first image. Control circuitry determines a second set of elements of the second image. Control circuitry determines whether at least one element of the first set of elements corresponds to at least one element of the second set of elements. Control circuitry determines that a transient element is present in the first set of elements and is not present in the second set of elements. Control circuitry generates for display the transient element on the second user device.

20 Claims, 11 Drawing Sheets

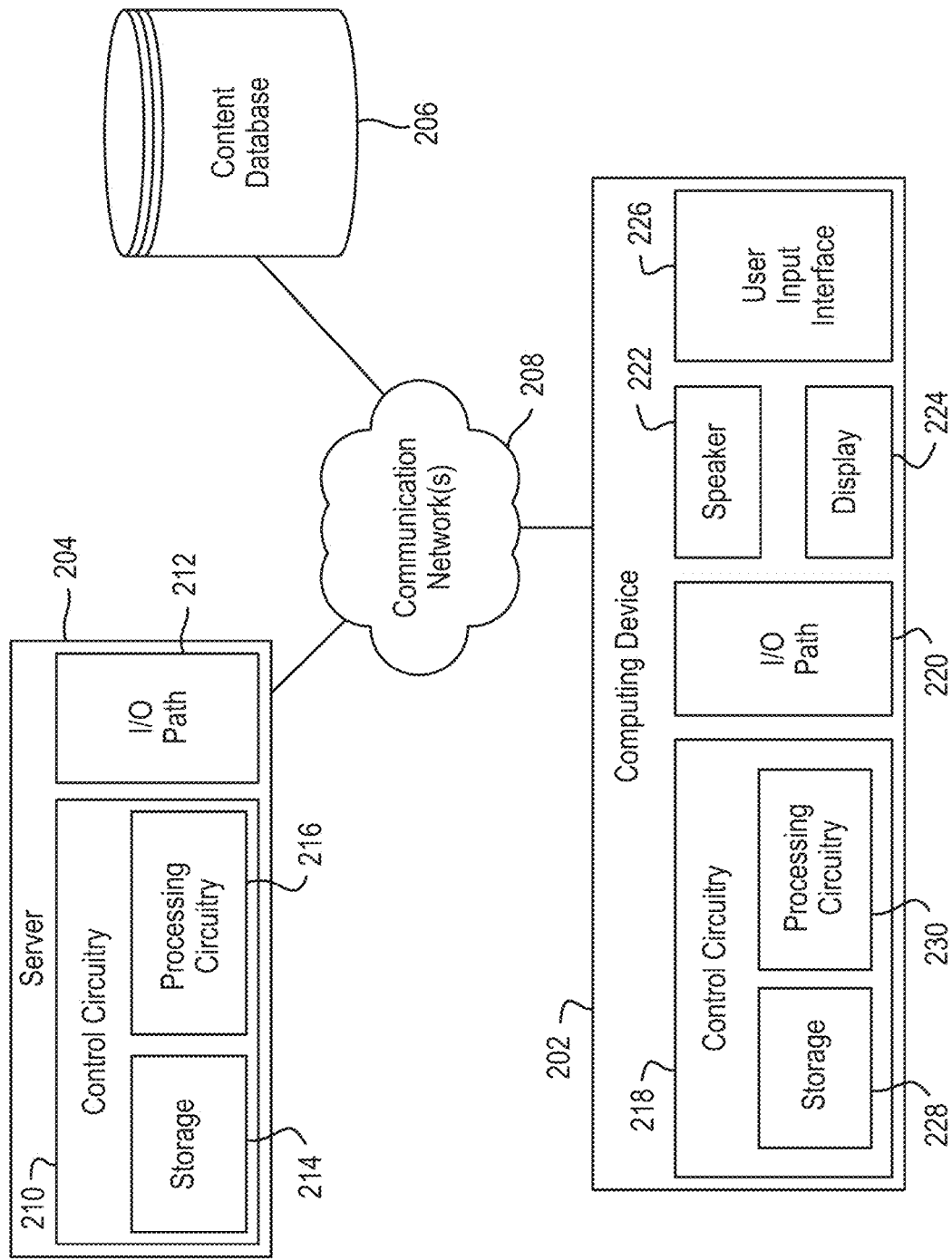

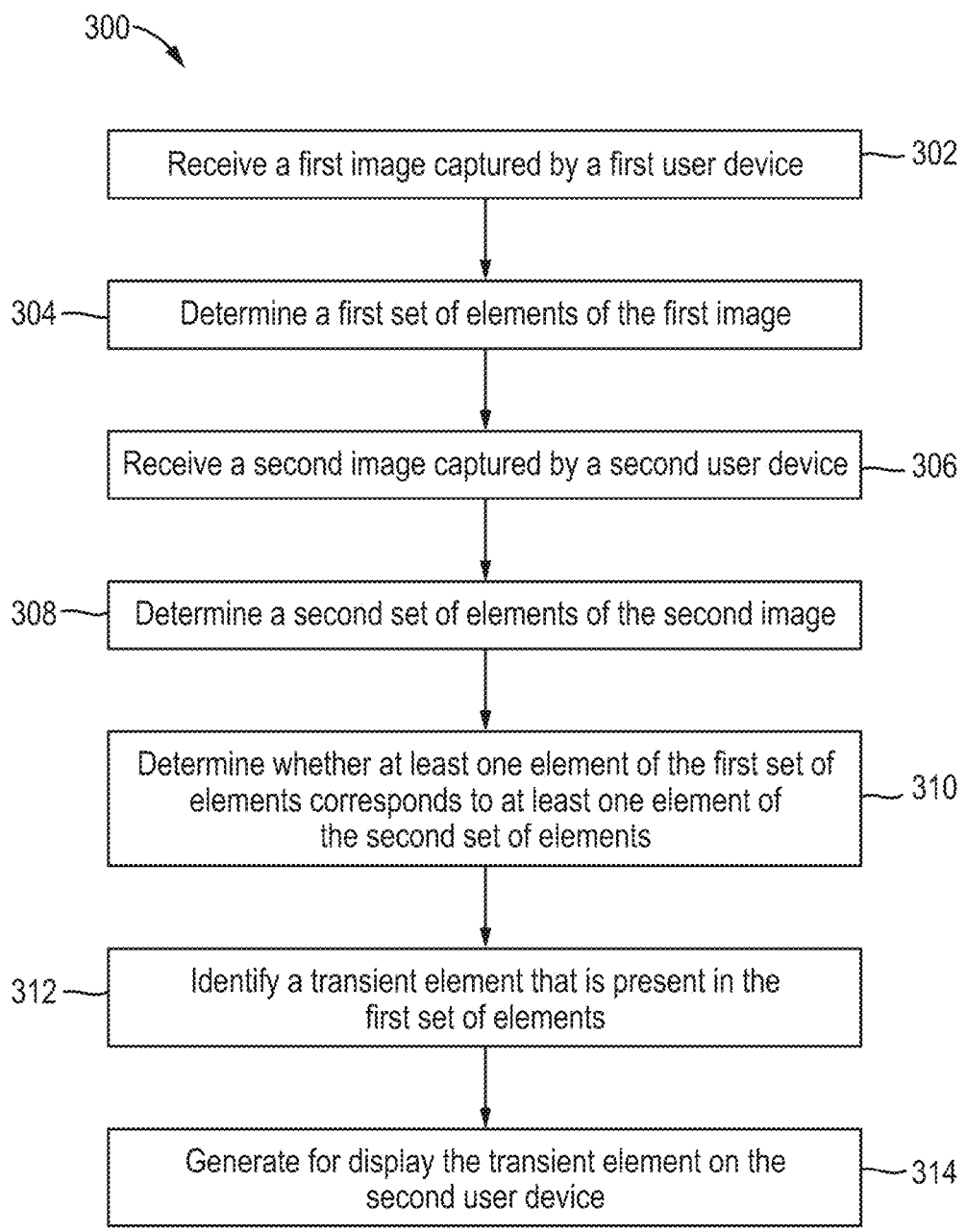

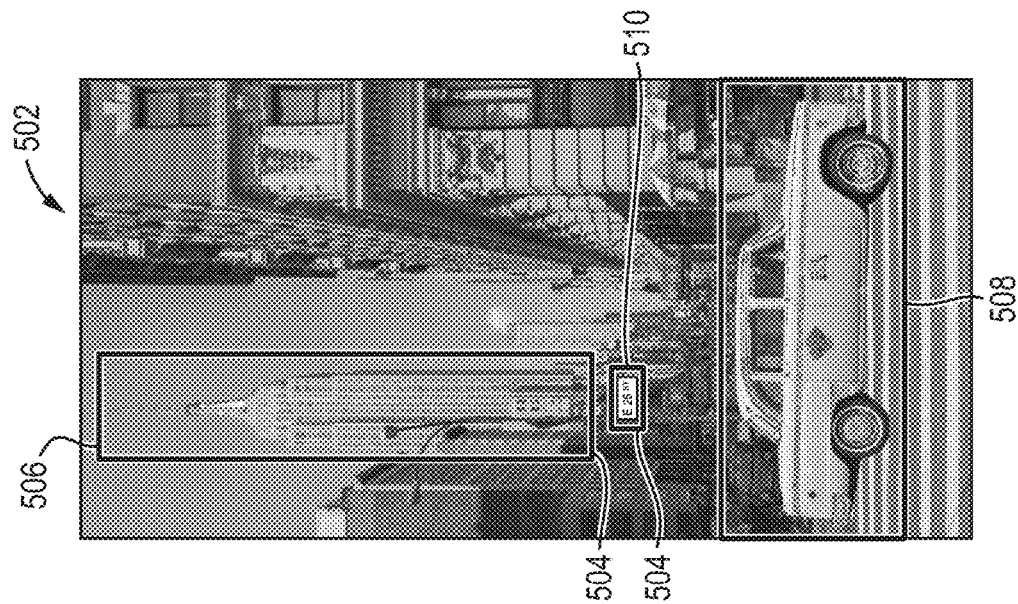
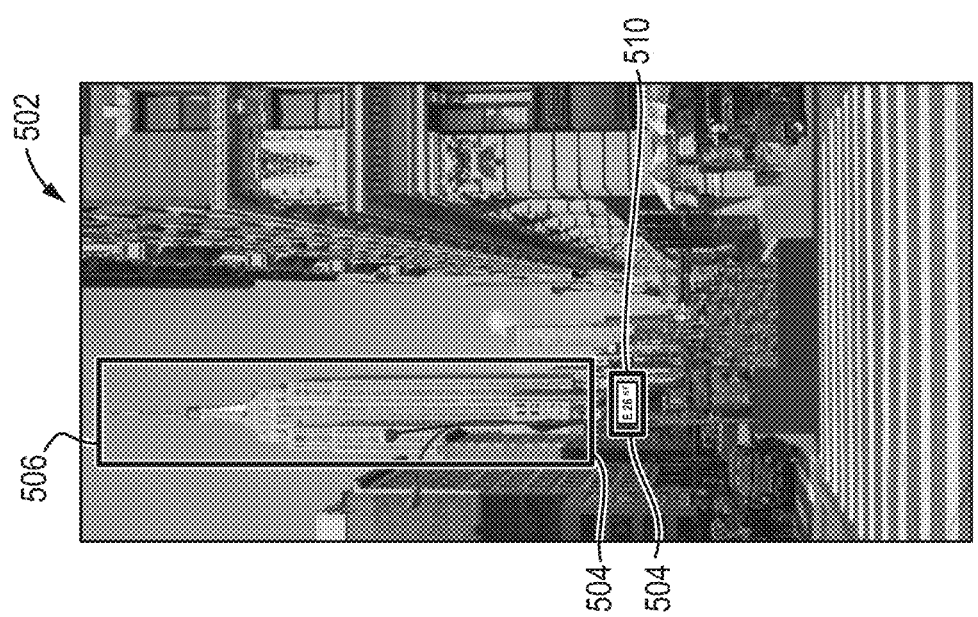

METHODS AND SYSTEMS FOR SHARING AN EXPERIENCE BETWEEN USERS

BACKGROUND

The present disclosure relates to methods and systems for sharing an experience between users. Particularly, but not exclusively, the present disclosure relates to capturing a common experience on a first user's device and a second user's device, and generating for display on the second user's device a transient event captured on the first user's device.

SUMMARY

It is common for users to share a common experience, such as visiting a city, watching a sporting event or working on a common project. For example, first and second users may be exploring a city, e.g., at slightly different times and/or along slightly different routes, when the first user experiences an event. In such a case, it is desirable to notify the second user of the event and direct the second user to the event so that the second user can share in the experience of the first user. For example, the second user may have already visited the location at which the event is occurring, but missed witnessing the event. In such a case, it is desirable to remind the second user of that location and notify the second user that the event may be occurring. In other examples, a first user may visit a particular landmark at a first point in time and witness an event that is no longer occurring when a second user visits the same landmark at a second point in time. In such cases, it is desirable for the second user to be able to experience the event witnessed by the first user at a particular location, despite the event no longer occurring when the second user visits that location. In some cases, the event may be an unusual event, e.g., a transient event, the occurrence of which is difficult to predict.

Systems and methods are provided herein for allowing users to share in experiencing transient events. For example, a first user may capture, on a first user device, a transient event, such as a street performance, occurring at a first location, such as a famous landmark. A second user may visit a location near to the famous landmark, e.g., as the street performance is still occurring or after the street performance has finished. The systems and methods provided herein are beneficial as they may notify the second user of occurrence of the transient event, e.g., relative to their current position. In some examples, the systems and methods generate a notification regarding the proximity of the second user to the location of the transient event, e.g., the location at which the transient event is occurring or occurred. In some examples, the systems and methods may provide navigational instructions for the second user to navigate towards the location of the transient event. In cases where the transient event is no longer occurring, the systems and methods may generate for display on a second user device a representation of the transient event captured by the first user device, e.g., as the second user approaches the first location. For example, the systems and methods described herein may provide for overlaying a representation of the transient event, e.g., the street performance, on a display of the second user device. In some examples, the second user device may be an augmented reality device, e.g., that the second user is using or wearing while exploring a city. If desired, the representation of the transient event may be overlaid on an image or scene previously captured or recorded (e.g., by the second user device or some other device owned by or associated with the second user) and that is accessible by the second user device (e.g., via local storage, via a server used for cloud storage, etc.). In some instances, the second user device receives the representation of the transient event as part of a data set representing a one or more objects observed by the first user device (e.g., one or more elements in an image or scene). These may include static objects (e.g., buildings, signs, etc.) that can serve as reference or indicator objects. In such an example, the second user device may analyze the data set to determine whether the second user device is currently displaying (e.g., as part of an augmented reality (AR) scene), or has at some point displayed, one or more of the received objects. The second user device may respond to detecting common reference objects by displaying a relevant scene (e.g., an image or video of the location, previously captured by the second user) with the representation of the transient event overlaid on the relevant scene. In this manner, the second user can appreciate the transient event as if she saw it from her own point of view when she previously visited the location. In some instances, the representation of the transient event may be transformed or otherwise manipulated (e.g., based on differences in distance and/or angles determined from analyzing the common reference objects associated with the first and second devices).

In some examples, a first user may capture, on a first user device, a transient event, such as a sunset, occurring at a first location, such as a mountain range. A second user may visit the mountain range, but at a different time of day, or when weather conditions are different. The systems and methods provided herein are beneficial as they generate for display on a second user device the transient event captured by the first user device, e.g., as the second user visits the first location. For example, the systems and methods described herein may provide for overlaying a representation of the transient event, e.g., the sunset, on an image, e.g., of the mountain range, captured when the sunset was not occurring.

According to some examples, methods and systems are provided, e.g., for improved sharing of an experience between users, in which a first image captured using a first user device is received by control circuitry. A second image captured using a second user device is received by the control circuitry. Control circuitry determines a first set of elements of the first image. Control circuitry determines a second set of elements of the second image. Control circuitry determines whether at least one element of the first set of elements corresponds to at least one element of the second set of elements. Control circuitry determines that a transient element is present in the first set of elements and is not present in the second set of elements, e.g., in response to determining that at least one element of the first set of elements corresponds to at least one element of the second set of elements. Control circuitry displays (e.g., generates for display) the transient element, or at least a representation of the transient element, on the second user device.

In some examples, the second user device is an augmented reality device. In some examples, displaying the transient element on the second user device comprises overlaying the transient element of the first image onto the second image to provide an augmented reality experience. For example, control circuitry may be configured to generate a representation of the transient element to enable a user of the second user device to view the transient element, e.g., as witnessed by a user of the first user device, in an augmented reality of the second user's environment.

In some examples, control circuitry determines a difference between the first set of elements of the first image and the second set of elements of the second image. For example, control circuitry may be configured to determine a difference in the relative sizes and/or positions of respective elements of the first and second images. In some examples, control circuitry is configured to modify the transient element (or a representation of the transient element) when overlaying the transient element (or a representation of the transient element) onto the second image based on the determined difference or differences. For example, control circuitry may be configured to visually manipulate the transient element to cause it to better fit the relative sizes and/or positions of the elements of the second image, e.g., so that the transient element appears more naturally in an augmented reality environment.

In some examples, the second image is captured at a first time-interval after the first image was captured. For example, the second image may be captured by the second user device as the second user visits a location that the first user has already visited. In some examples, the second image may be captured before the first image. For example, the second image may be an image captured by the second user device at a point in time before the first image is captured by the first user device, e.g., where the second user has previously visited the location that the first user is visiting.

In some examples, the second image is an image accessible by the second user device. For example, the second image need not be directly captured by the second user device, but may be an image stored in a database to which the second user device has access. For example, the database may be an image or video library stored in a profile of the second user.

In some examples, at least one further image captured by the first user device is received by control circuitry, the at least one further image being captured at a second time-interval from when the first image was captured. Control circuitry may determine a further set of elements of the further image. Control circuitry may identify the transient element by comparing the relative positions between the elements in the first set of elements and the relative positions between the elements in the further set of elements. In some examples, control circuitry determines a gaze of a user operating the first user device when capturing the first image and a gaze of the user operating the first user device when capturing the at least one further image. Control circuitry may determine a change in the gaze of the user operating the first user device between capturing the first image and the least one further image. Control circuitry may identify the transient element based at least on the change in the gaze of the user. In some examples, control circuitry may identify the transient element by comparing the relative positions between the elements in the first set of elements, the relative positions between the elements in the further set of elements and the change in the gaze of the user.

In some examples, in response to identifying the transient element, control circuitry monitors the position of the transient element and/or the position of an article contained in the transient element of the first image.

In some examples, when generating for display the transient element on the second user device, control circuitry overlays the transient element, or at least a representation of the transient element, of the first image onto the second image.

In some examples, when overlaying the transient element of the first image onto the second image, control circuitry modifies the transient element.

In some examples, control circuitry determines a first location associated with the first image. Control circuitry may determine a second location associated with the second image. Control circuitry may cause navigational instructions to be generated to navigate from the second location towards the first location. The navigational instructions may be received at the second user device.

In some examples, control circuitry determines a travel time between the first and second locations. In some examples, the instructions to navigate from the second location towards the first location are generated in response to the travel time between the first and second locations being below a predetermined travel time threshold.

In some examples, control circuitry captures a third image using the second user device as the second user device moves towards the first location. Control circuitry may determine a third location associated with the third image and/or a location of the second user device. In some examples, control circuitry overlays the transient element, or representation of the transient element, of the first image onto the third image when the third location associated with the third image and/or the location of the second user device is/are within a predetermined threshold distance from the first location. In some examples, control circuitry does not overlay the transient element, or representation of the transient element, of the first image onto the third image when the third location associated with the third image and/or the location of the second user device is/are outside of a predetermined threshold distance from the first location.

In some examples, control circuitry determines an orientation of the first user device when capturing the first image. Control circuitry may determine an orientation of the second user device when capturing the third image. Control circuitry may determine a difference between the orientation of the first user device and the orientation of the second user device. In some examples, control circuitry modifies the transient element, or representation of the transient element, based on the difference between the orientation of the first user device and the orientation of the second user device, when overlaying the transient element, or representation of the transient element, of the first image onto the third image.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 is a block diagram showing components of an example system for sharing an experience between users, in accordance with some examples of the disclosure;

FIG. 3 is a flowchart representing a process for sharing an experience between users, in accordance with some examples of the disclosure;

FIG. 5A illustrates another image having a second set of elements, in accordance with some examples of the disclosure;

FIG. 5B illustrates the image shown in FIG. 5A having an overlaid representation of a transient event, in accordance with some examples of the disclosure;

DETAILED DESCRIPTION

Figure 1:
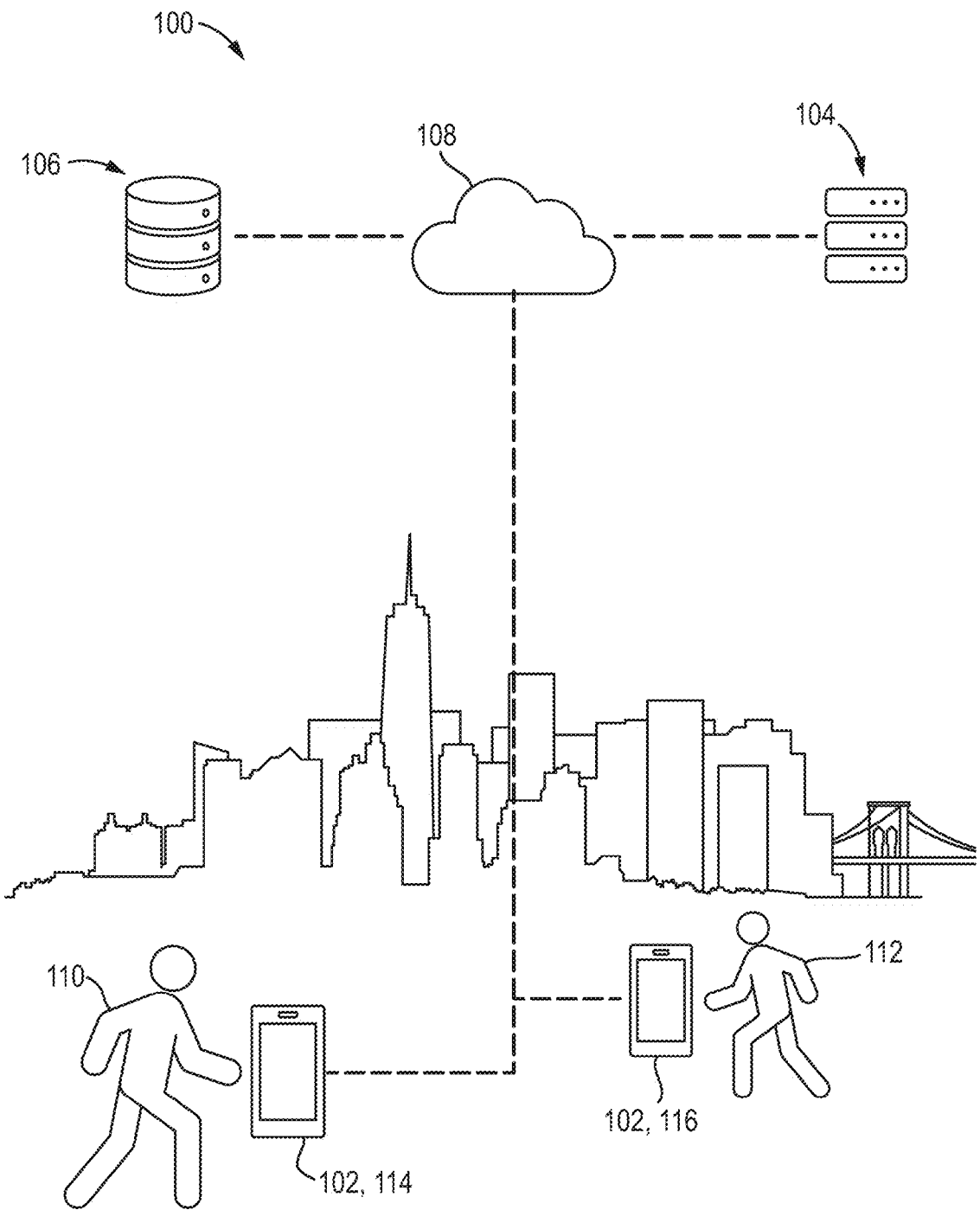
FIG. 1 illustrates an overview of a system for sharing an experience between users, in accordance with some examples of the disclosure.

FIG. 1 illustrates an overview of a system 100 for sharing an experience between users. For example, a first user 110 and a second user 112 may be visiting a city, such as New York. The example shown in FIG. 1 shows the first and second users 110, 112 exploring New York together, e.g., both users are located in the city, so that they share the common experiences offered by the city. However, the first and second users 110, 112 need not be in the same place in the city at the same time. For example, the first user 110 may be a few hundred meters away from the second user 112 as they explore the city. In other cases, the first and second users 110, 112 may be visiting the city at different times, e.g., days, weeks or months apart. As such, one of the users may witness a transient event occurring in one part of the city, while the other of the users may miss the transient event when visiting the same (or similar part of the city) at a different time. Irrespective of the timing of each user 110, 112 exploring the city, the systems and method provided herein account for users being able to share in witnessing a transient event when sharing a common experience.

In the example shown in FIG. 1, system 100 includes multiple user devices 102, such as a headset, a smartphone, tablet computer, or the like, configured to display or otherwise provide media content to one or more respective users. System 100 may also include network 108 such as the Internet, configured to communicatively couple user devices 102 to one or more servers 104 and/or one or more content databases 106 from which media content, such as images and videos, may be obtained for display on the user devices 102. User devices 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user devices 102. In some examples, one or more of the user devices 102 may comprise an imaging device configured to capture images and/or video. For example, the user device 102 may be a smartphone having a camera configured to capture an image of the user's surroundings as the smartphone is held toward the user's surroundings. In some examples, one or more of the user devices 102 may be an augmented reality headset having an outward-facing camera and an inward-facing display. In some examples, the system may comprise one or more separate imaging devices communicatively coupled to a user device 102. For example, a user may operate a camera, such as a headcam, to capture one or more images/videos as the user explores the city.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for displaying and or capturing content, e.g., images and/or videos, as described above. In some examples, the user equipment device may have a front-facing screen and a rear-facing screen, multiple front screens, or multiple angled screens. In some examples, the user equipment device may have a front-facing camera and/or a rear-facing camera.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204 (e.g., server 104), and content database 206 (e.g., content database 106), each of which is communicatively coupled to communication network 208 (e.g., network 108), which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216, which may comprise imaging processing circuitry. Computing device 202, which may be an augmented reality headset, a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to capture an image and/or video, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 4A:
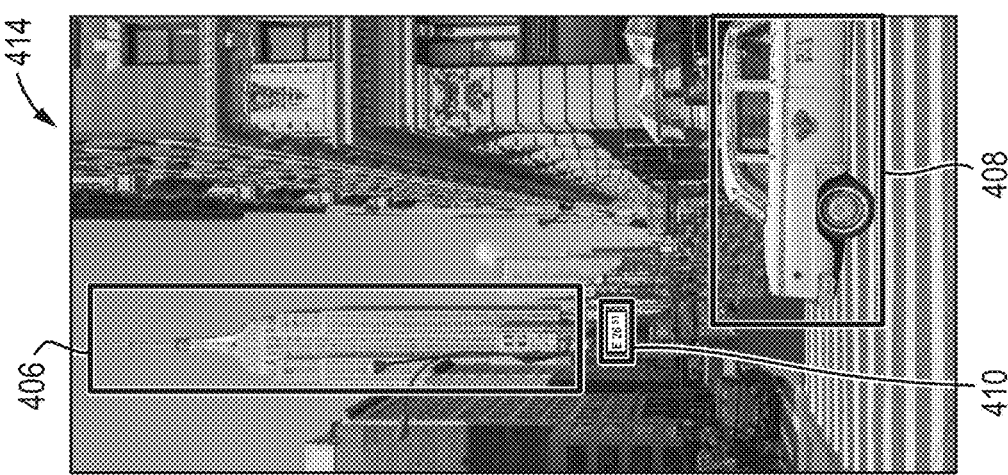
FIG. 4A illustrates an image having a first set of elements at a first point in time, in accordance with some examples of the disclosure.
Figure 4B:
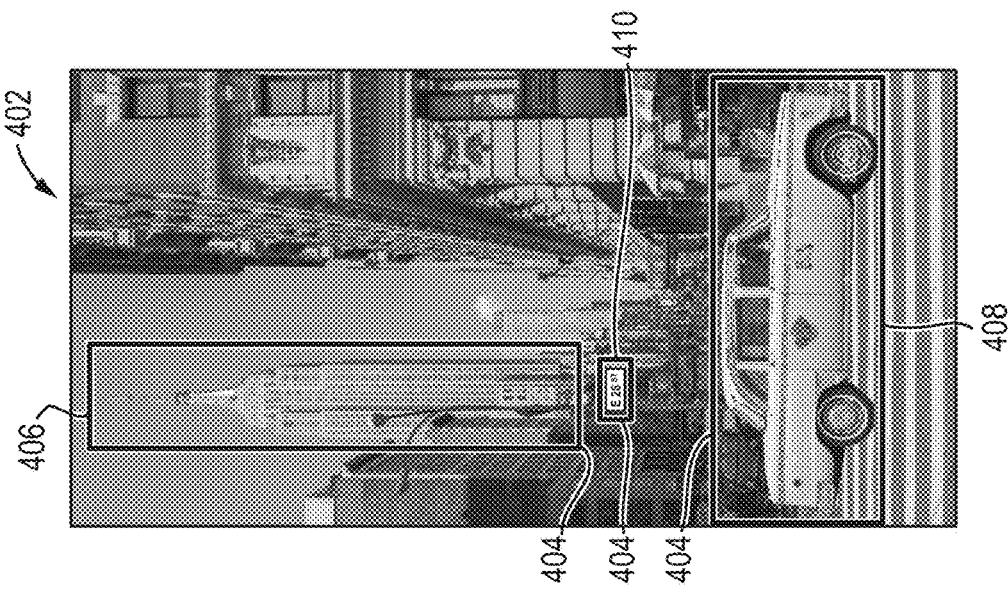
FIG. 4B illustrates another image having a first set of elements at a second point in time, in accordance with some examples of the disclosure.
Figure 4C:
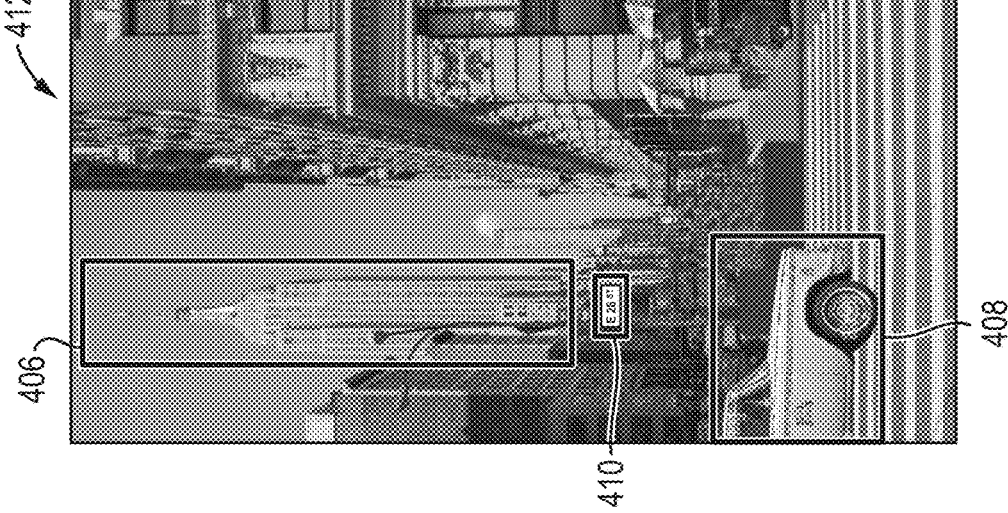
FIG. 4C illustrates a third image having a first set of elements at a third point in time, in accordance with some examples of the disclosure.

FIG. 3 is a flowchart representing an illustrative process 300 for sharing an experience between users, in accordance with some examples of the disclosure. FIGS. 4A to 4C show first to third images respectively, each image having a set of elements comprising a transient element. FIG. 5A shows another image, and FIG. 5B shows the image of FIG. 5A having a transient element overlaid onto the image. While the example shown in FIGS. 3, 4A to 4C, 5A and 5B refers to the use of system 100, as shown in FIG. 1, it will be appreciated that the illustrative process described in FIGS. 3, 4A to 4C, 5A and 5B, and any of the other following illustrative processes, may be implemented on system 100, either alone or in combination with any other appropriately configured system architecture, such as system 200 shown in FIG. 2.

At 302, control circuitry receives a first image 402, e.g., that was captured using a first user device 114. In the example shown in FIG. 4B, the first image 402 is an image of a view looking north up $5^{th}$ Avenue from East $26^{th}$ Street showing the Empire State Building and a classic New York style taxi. To add context, the first image 402 may have been captured using the user device 114 of the first user 110 as the first user 110 explores the city.

At 304, control circuitry determines a first set of elements 404 of the first image 402. In the example shown in FIG. 4B, the first image 402 has a first set of elements 404 comprising a first element 406 showing The Empire State Building, a second element 408 showing a classic New York style taxi, and a third element 410 showing a street sign (East $26^{th}$ Street). Determination of the first set of elements 404 may be performed on user device 114, e.g., using control circuitry 218, and/or on a server, e.g., using control circuitry 210. Determination of the elements may be performed using one or more image processing techniques, e.g., involving techniques such as classification, feature extraction, multiscale signal analysis, pattern recognition, projection, and/or any other appropriate technique. For example, control circuitry may access a library of images, e.g., stored on database 106, and compare one or more images in the library to the first image 402. In some examples, user device 102 may add metadata to a captured image to help describe where the image was captured. For example, user device 102 may add one or more tags, e.g., a location tag, a time stamp, etc., to an image to identify where the image was captured. Control circuitry may use these tags to help identify a relevant image library. For example, first user device 114 may add a location tag indicating that the first image 402 was captured in New York. This information may be used to help search for libraries containing images relevant to New York. Additionally or alternatively, control circuitry may be configured to perform one or more natural language processing techniques, such as text processing, to help determine the content of an image. In the example shown in FIG. 4B, control circuitry may use image processing techniques and natural language processing techniques to identify element 410 as a street sign and determine that the sign reads E 26 St. Such information may be used to help identify one or more relevant image databases, which may be used to help identify the content of an image and, optionally, add metadata to the image to describe its content. In some examples, control circuitry may be configured to determine a geometrical relationship between two or more of the elements. For example, control circuitry may determine the position and/or orientation of each element relative to at least one other element. In the example shown in FIG. 4B, control circuitry may analyse the first image 402 to determine the relative positions and orientations of the first element 406, the second element 408 and the third element 410. For example, control circuitry may determine the distances between the center of geometry of each element and their relative angular orientations.

At 306, control circuitry receives a second image 502, e.g., that was captured using a second user device 116. In the example shown in FIG. 5A, the second image 502 is an image similar to image 402, i.e., the second image is also a view looking north up 5th Avenue from East 26th Street showing the Empire State Building. However, the second image 502 does not show a classic New York style taxi. In a similar manner to the first image 402, the second image may have been captured using the user device 116 of the second user 112 as the second user 112 explores a similar part of the city at a different time. As such, at the moment the second user device 116 captured the second image 502, the classic New York style taxi was no longer in shot. For the avoidance of doubt, the terms first and second, when used to describe an image, do not limit the order in which the images are taken. For example, the first image may be taken before or after the second image.

At 308, control circuitry determines a second set of elements 504 of the second image 502. In the example shown in FIG. 5A, the second image 502 has a first set of elements 504 comprising a first element 506 showing The Empire State Building and a second element 510 showing a street sign (East 26$^{th}$ Street). Determination of the first set of elements 404 may be performed in a manner similar the that described above at 304.

At 310, control circuitry determines whether at least one element of the first set of elements 404 corresponds to at least one element of the second set of elements 504. In some examples, control circuitry may compare, e.g., by virtue of direct visual comparison, the first image 402 to the second image 502. Additionally or alternatively, control circuitry may compare metadata of the first image 402 to metadata of the second image 502, e.g., to help determine if there are one or more common elements in the images. For example, location metadata may have been added to the first image 402 at 304, and location metadata may have been added to the second image 502 at 308. In such an example, control circuitry may compare the metadata of the first image 402 to the metadata of the second image 502 to determine whether the images were taken at the same location or similar locations. In some examples, the first user 110 and the second user may be part of a social network. As such, control circuitry may be configured to compare, e.g., automatically compare, any images accessible by the social network. For example, where the first user 110 uploads the first image 402 and the second user uploads the second image 502 to a social network, control circuitry may automatically compare the images, e.g., based on the first and second users 110, 112 being part of a group on the social network. Following the above example, in response to control circuitry comparing the first image 402 and the second image 502, control circuitry may determine that the first and third elements 406, 410 of the first image 402 correspond to, e.g., match, the first and second elements 506, 510 of the second image 502.

At 312, control circuitry identifies an element that is present in the first set of elements 404 and not present in the second set of elements 504. In the context of the present disclosure, such an element is referred to as a transient element, meaning that its determined content is time dependent. For example, control circuitry may determine that element 408 shown in FIG. 4B is a transient element based on the fact that the first and second images 402, 502 were taken at the same location (or similar locations) and that element 408 of the first image 402 does not have a corresponding element in the second image 502. In such an example, determination of whether an element is a transient element is made based on a comparison between the first image 402 and the second image 502. Additionally or alternatively, control circuitry may identify an element of an image as a transient element based on a series of images captured by a user device. For example, FIGS. 4A to 4C show a series of images captured using the first user device 114, in which FIG. 4A shows an image 412 captured a moment before the first image 402, and FIG. 4C shows an image 414 captured a moment after the first image 402. In some examples, control circuitry may identify common elements between the images 402, 412, 414 and determine a change to one or more of the common elements. For example, control circuitry may determine that each of images 402, 412, 414 comprise the first element 406, the second element 408 and the third element 410, and that the third element 410 changes, e.g., in shape and/or size, or existence, through the series of images. In the example shown in FIGS. 4A to 4C, element 408 has been identified as a transient element, e.g., meaning that the content of transient element 408 of the first image 402, e.g., the classic New York style taxi, was only able to be captured in shot for a short amount of time. As such, is unlikely that the second user would witness a classic New York style taxi driving in front of the Empire State Building, even if the second user 112 were to visit the location at which the first user 110 captured the first image 402 using the first user device 114.

At 314, control circuitry generates for display the transient element 408 on the second user device 116. For example, in response to control circuitry determining that at least one element of the first set of elements 404 corresponds to at least one element of the second set of elements 504, and that one of the elements of the first set of elements 404 is a transient element, control circuitry causes a representation 508 of the transient element 408 to be overlaid onto the second image 502 (see FIG. 5B). In the example shown in FIG. 5B, control circuitry has caused a representation of a classic New York style taxi to be overlaid onto the second image. In some examples, the representation 508 may comprise a copy of the content of the transient element 408 of the first image 402. Alternatively, control circuitry may access one or more databases to identify one or more stock images that may be used to represent the content of the transient element 408 of the first image 402. In other examples, control circuitry may modify the content of the transient element 408 of the first image 402 and/or the content of the second image 502 so that the representation 508 appears to fit naturally over the second image 502. Such modification is described in further detail below in relation to process 600. Additionally or alternatively, control circuitry may cause the representation 508 to be positioned and/or orientated on the second image 502 based on the position and/or orientation of the third element 408 determined at 304.

The example described in relation to FIGS. 3 to 5B illustrates the first user 114 sharing the experience of witnessing a classic New York style taxi driving past the iconic Empire State Building, e.g., by overlaying a representation of a classic New York style taxi on an image of the Empire State Building captured at a different moment in time by the second user 116. However, process 300 may be implemented in other various situations, such as over laying a representation of an individual, e.g., a friend or family member, onto an image not containing that individual, overlaying a representation of a natural event, e.g., a thunder storm, onto an image not containing that natural event, and so on.

The actions or descriptions of FIG. 3 may be used with any other example of this disclosure, e.g., the example described below in relation to FIGS. 6A to 11B. In addition, the actions and descriptions described in relation to FIG. 3 may be done in any suitable alternative orders or in parallel to further the purposes of this disclosure.

Figure 6A:
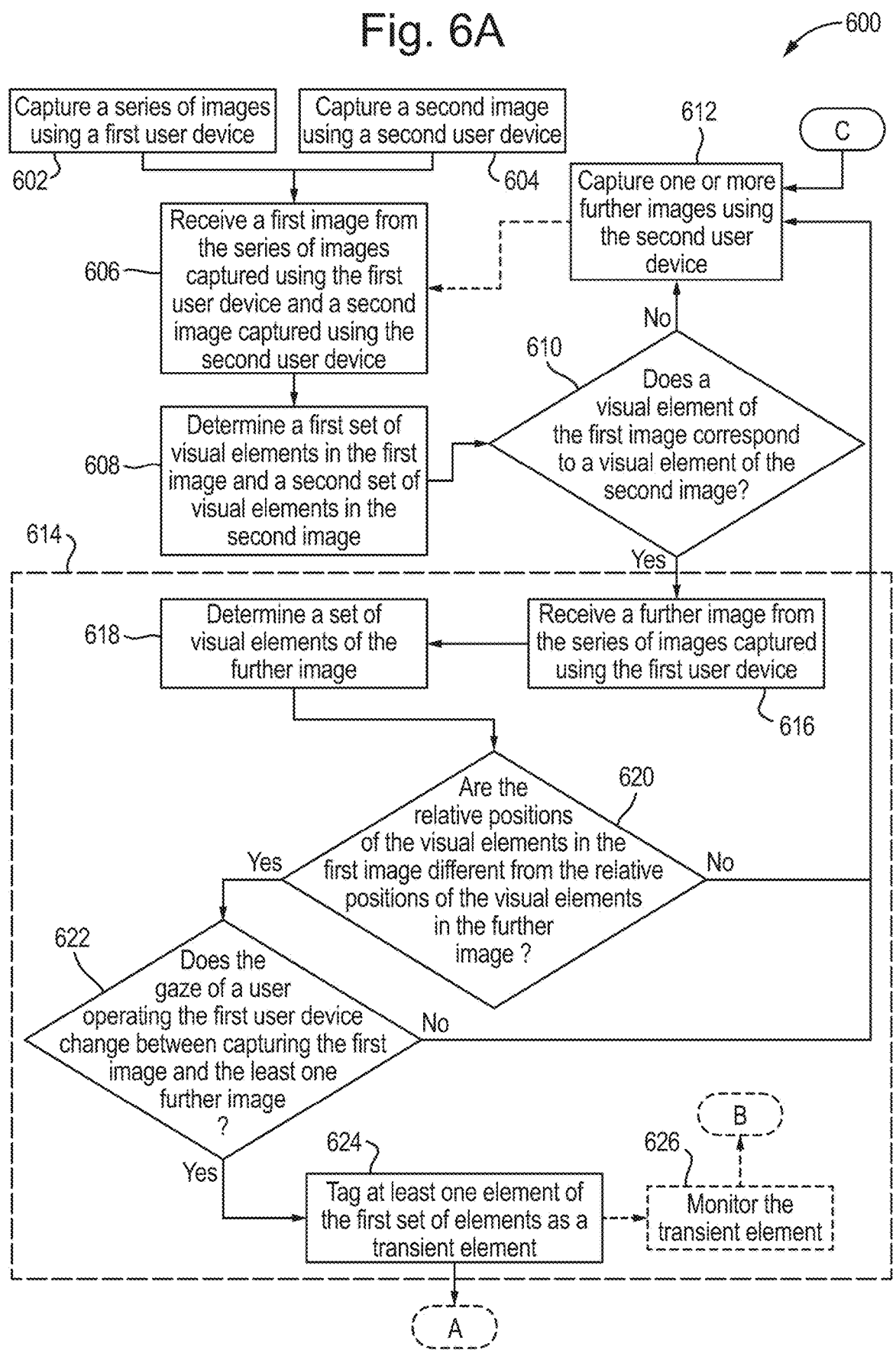
FIG. 6A is a flowchart representing a process for overlaying a transient element on an image.
Figure 6B:
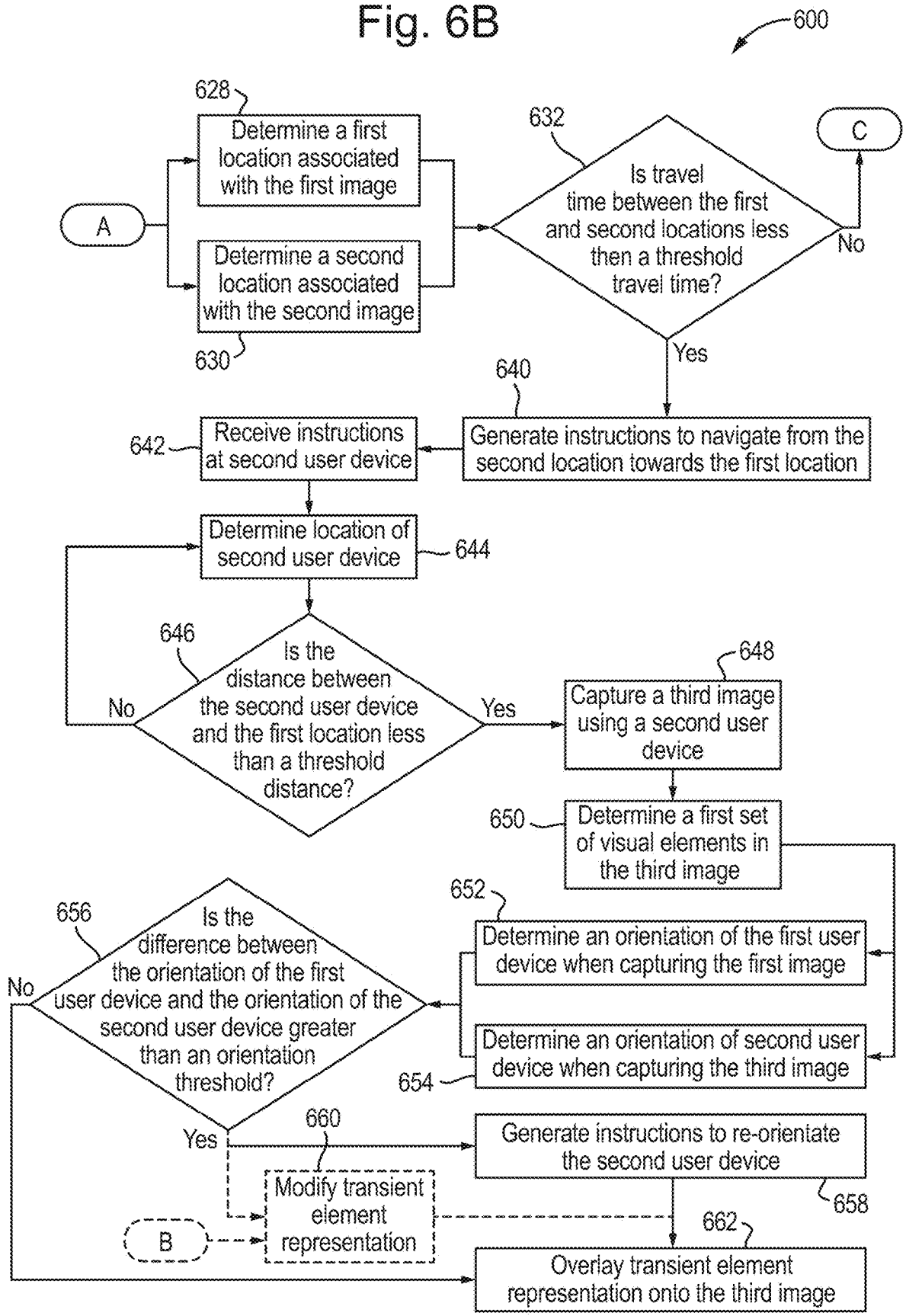
FIG. 6B is a continuation of the flowchart shown in FIG. 6A.
Figure 7:
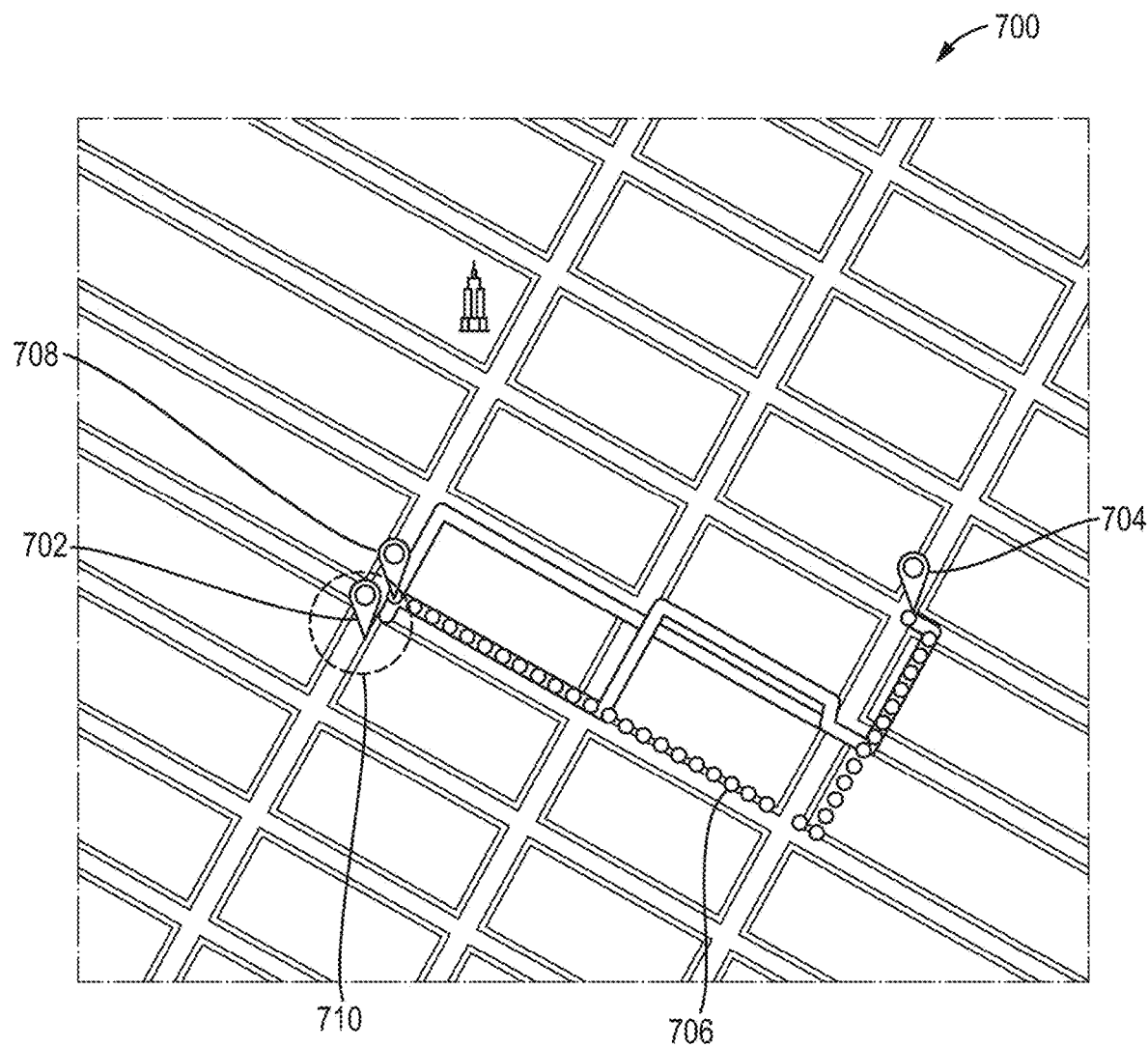
FIG. 7 illustrates a map showing navigation between locations associated with multiple images, in accordance with some examples of the disclosure.
Figure 8A:
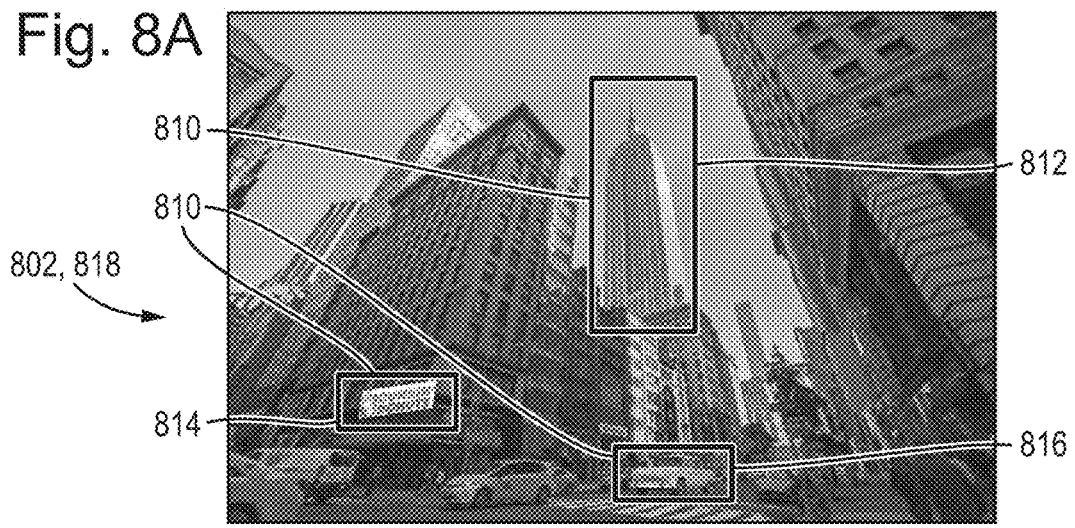
FIG. 8A illustrates an image having a first set of elements at a first point in time, in accordance with some examples of the disclosure.
Figure 8B:
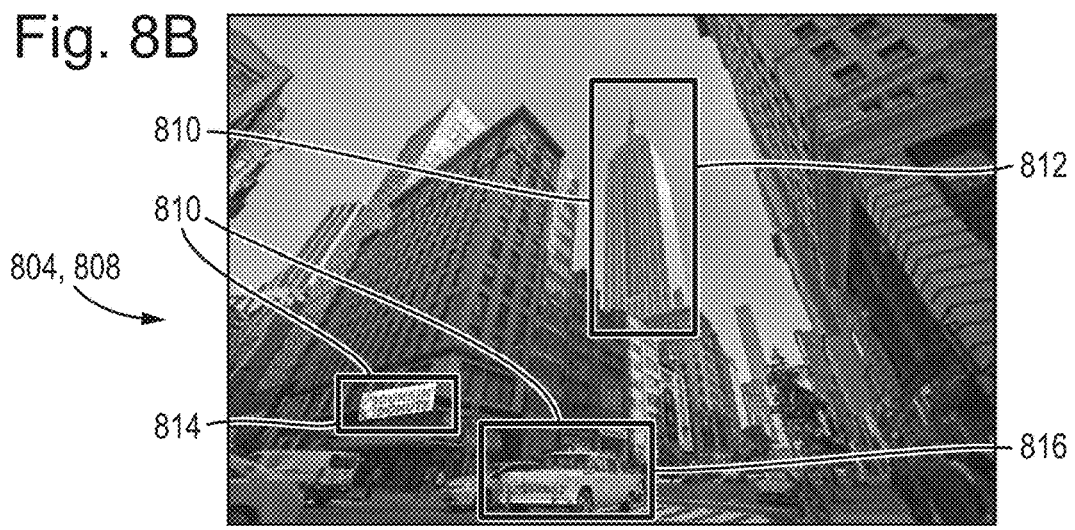
FIG. 8B illustrates another image having a first set of elements at a second point in time, in accordance with some examples of the disclosure.
Figure 8C:
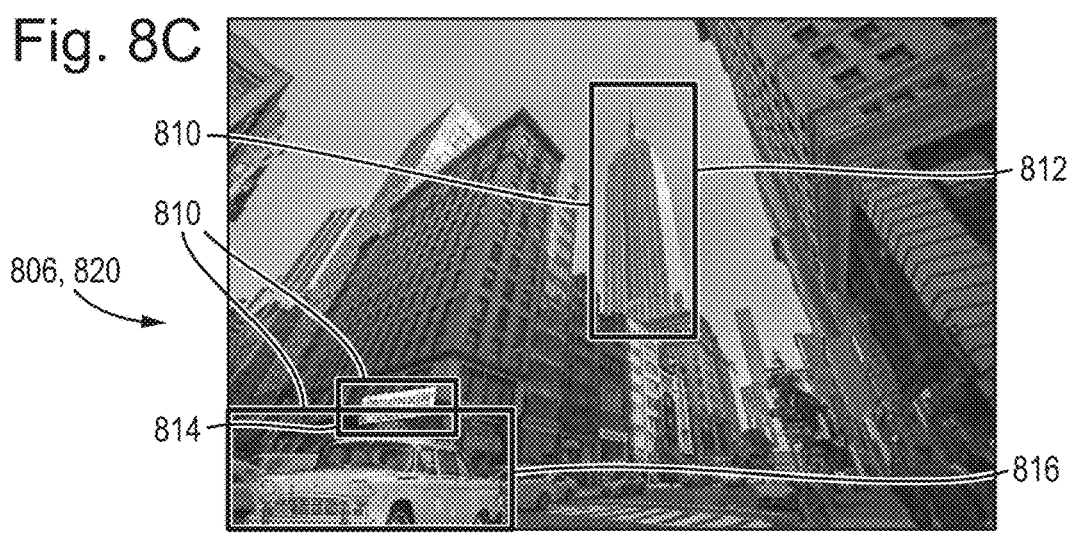
FIG. 8C illustrates another image having a first set of elements at a third point in time, in accordance with some examples of the disclosure.
Figure 9:
FIG. 9 illustrates another image having a further set of elements, in accordance with some examples of the disclosure.
Figure 10A:
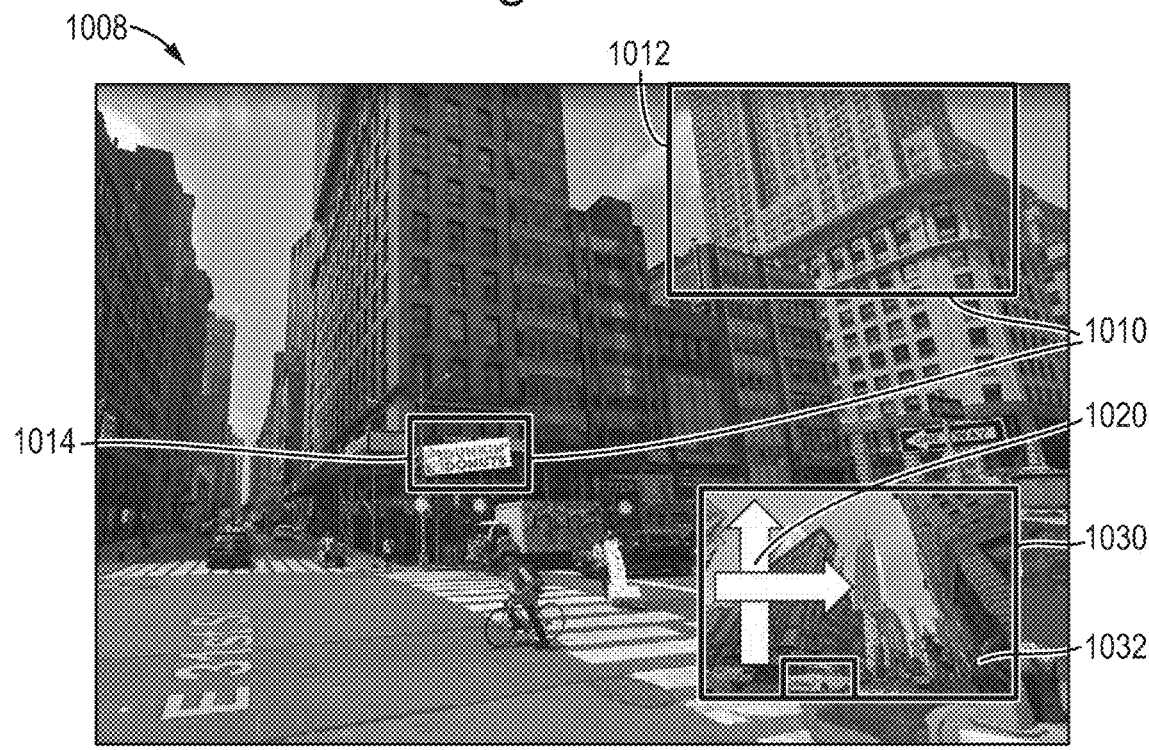
FIG. 10A illustrates another image having a further set of elements, in accordance with some examples of the disclosure.
Figure 10B:
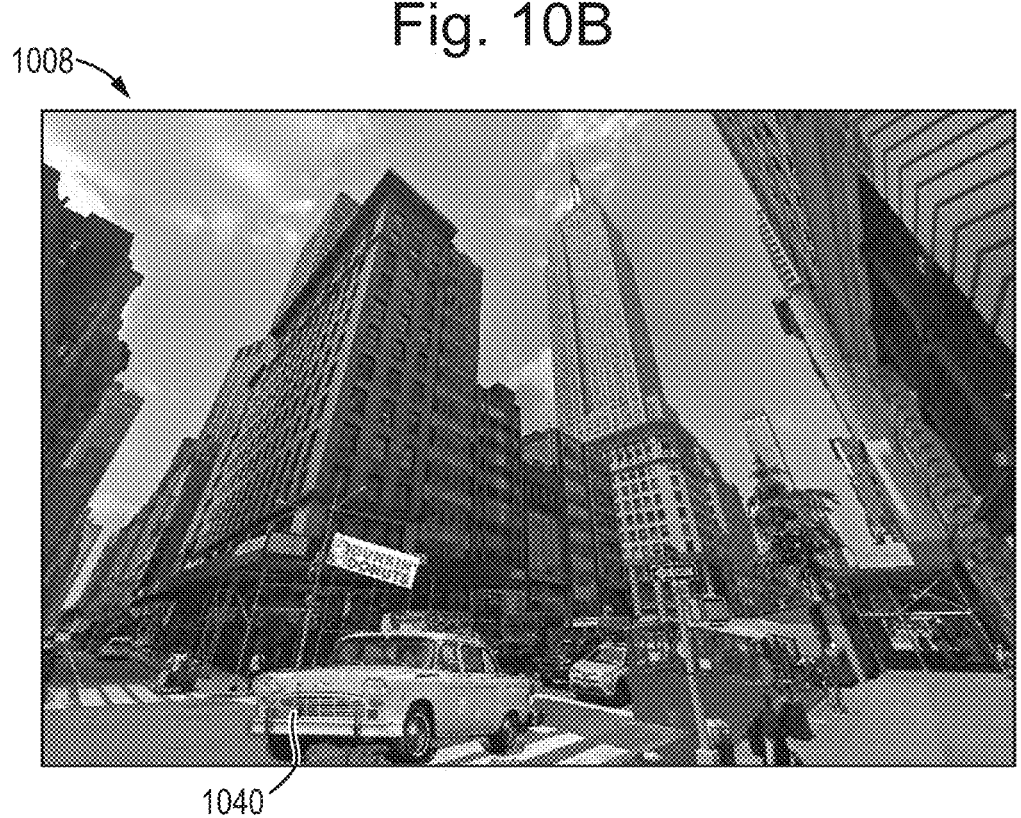
FIG. 10B illustrates the image shown in FIG. 10A having an overlaid representation of a transient event, in accordance with some examples of the disclosure.

FIGS. 6A and 6B show a flowchart representing an illustrative process 600 for sharing an experience between users, in accordance with some examples of the disclosure. FIG. 7 shows navigation between locations associated with various images. FIGS. 8A to 8C illustrate various images each having a first set of elements at a different point in time. FIGS. 9 and 10A illustrate further image each having a respective set of elements. FIG. 10B illustrates another image having a set of elements including an overlaid representation of a transient event. While the example illustrated by FIGS. 6A to 10B refers to the use of system 100, as shown in FIG. 1, it will be appreciated that the illustrative process described in relation to FIGS. 3 to 5B, and any of the other illustrative processes described herein, may be implemented on system 100, either alone or in combination with any other appropriately configured system architecture, such as system 200 shown in FIG. 2.

At 602, control circuitry causes a first user device 114 to capture a series of images (or a video). In the example shown in FIGS. 8A to 8C, a series of images 802, 804 and 806 ( . . . 80N—not shown) have been captured using the first user device 114, e.g., as the first user 110 walks around New York. In particular, images 802 to 806 are images taken from the corner of 5th Avenue and East 31st Street looking up at the Empire State Building and showing a classic New York style taxi driving by. In some examples, the first user 110 causes the series of images 802, 804, 806 to be captured, e.g., by issuing a command or commands to the first user device 114. In some examples, the series of images 802, 804, 806 may be captured as part of a video being recorded and/or streamed from the first user device 114. In other examples, the series of images 802, 804, 806 may be captured automatically, e.g., in response to a trigger event, such as a classic New York style taxi being in the field of view of the first user device 114.

At 604, control circuitry, e.g., control circuitry 218, causes a second user device 116 to capture at least one image (or video). In the example shown in FIG. 9, image 902 has been captured using the second user device 116, e.g., as the second user 112 walks around New York. In particular, image 902 has been taken from the corner of Park Avenue and East 33st Street looking up at the Empire State Building. Images may be captured using the second user device 116 in a similar manner to those captured using the first user device 114.

At 606, control circuitry, e.g., control circuitry 210, receives at least one of the series of images 802, 804, 806, e.g., first image 808, captured using the first user device 114, and a second image 908 captured using the second user device 116 (e.g., in a similar manner to that described under 302 and 306 above).

At 608, control circuitry, e.g., control circuitry 210, determines a first set of elements 810, in the first image 808 and a second set of elements 910, e.g., visual elements, in the second image 908. Determination of the elements may be performed in a similar manner to that described under 304 and/or 308 above. In the example shown in FIG. 8B, the first set of elements 810 comprises a first element 812, which contains the Empire State Building, a second element 814, which contains a Dunkin' Donuts sign, and a third element 816, which contains a classic New York style taxi. In the example shown in FIG. 9, the first set of elements 910 comprises a first element 912, which contains the Empire State Building, and a second element 914, which contains a Park Ave street sign.

At 610, control circuitry, e.g., control circuitry 210, determines if at least one element from the first set of elements 810 corresponds to an element from the second set of elements 910, which may be performed in a manner similar to that described under 310 above. When control circuitry cannot determine that an element from the first set of elements 810 corresponds to an element from the second set of element 910, process 600 moves to 612. When control circuitry can determine that an element from the first set of elements 810 corresponds to an element from the second set of elements 910, process 600 moves to 614. The determination of whether or not an element corresponds to another element may be probability based. For example, control circuitry may determine that one element has a certain percentage chance, e.g., 80%, of matching another element. Where the probability of the element matching is below a probability threshold, process 600 moves to 612, and where the probability of the element matching is equal to or above a probability threshold, process 600 moves to 614. In the example shown in FIGS. 8A to 8C and FIG. 9, element 812 corresponds to element 912, since both elements contain an at least partial view of the Empire State Building.

At 612, control circuitry, e.g., control circuitry 218, captures one or more further images using the second user device 116. In some examples, control circuitry, e.g., control circuitry 210, then receives the one or more further images to determine whether an element of at least one of the further images corresponds to an element of the first image 808. When control circuitry can determine that an element from at least one of the further images corresponds to an element from the first set of elements 810, process 600 can move to 614.

At 614, control circuitry, e.g., control circuitry 210, identifies a transient element that is present in the first set of elements 810, e.g., in response to determining that an element from the first set of elements 810 corresponds to an element from the second set of elements 910. In the example shown in FIG. 6A, 614 comprises 616, 618, 620, 622, 624 and 626. However, identifying whether a transient element is present in the first set of elements 810 may be carried out in any appropriate manner, e.g., as described under 312 above. Furthermore, in some examples, identification of a transient element may be carried out before 610. In such cases, performance of 614 may not be in response to completing 610, as shown in FIG. 6A.

At 616, control circuitry, e.g., control circuitry 210, receives at least one further image from the series of images 802, 804, 806 captured using the first user device 114. For example, control circuitry may receive an image 818 captured at a first time-interval before the first image 808, and image 820 captured at a second time-interval after the first image 808. In some examples, a first and second time-intervals may be set so as to define a period over which control circuitry can identify a transient element. For example, the first and second time-intervals may be set so as to define a transient event that occurs over a period of seconds, minute, or hours, etc. In the example shown in FIGS. 8A to 8C, the first and second time-intervals have each been set at a relative low value, e.g., a few seconds (5 or 10 seconds). In this manner, a transient element may be defined an element that contains content that changes over a period between the first and second time-intervals. While a short time period might be useful in capturing a transient event that occurs over a relatively short period of time, such as a classic car driving past, a longer period might be useful in capturing a transient event that occurs over a longer period of time, such as sunrise.

At 618, control circuitry, e.g., control circuitry 210, determines a first set of elements 810 of each of the further images 818, 820. For example, control circuitry may look for similar elements present in each of images 808, 818 and 820. In the example shown in FIGS. 8A to 8C, each of images 808, 818 and 820 comprise a first element 812, which contains the Empire State Building, a second element 814, which contains a Dunkin' Donuts sign, and a third element 816, which contains a classic New York style taxi.

At 620, control circuitry, e.g., control circuitry 210, compares the relative positions of the elements in the first image 808 different to the relative positions of the elements in the further images 818, 820. For example, control circuitry may determine a change in the relative geometric positions and/or orientations of the elements 812, 814 and 816 to help determine whether any of the elements are a transient element. When control circuitry determines no change in the relative geometric positions and/or orientations of the elements 812, 814 and 816, process 600 moves to 612. When control circuitry determines a change in the relative geometric positions and/or orientations of the elements 812, 814 and 816, process 600 moves to 622. In the example shown in FIGS. 8A to 8C, the third element 816 is determined to potentially be a transient element, since its position and/or orientation is changing relative to the first and second elements 812 and 814, e.g., in a manner similar to that described above under 312.

At 622, control circuitry, e.g., control circuitry 218, determines whether a gaze of the first user 110 operating the first user device 114 changes whilst capturing the series of images 802, 804, 806. For example, the first user device 114 may be fitted with a front camera capable of imaging the face of the first user 110 while the first user operates the first user device 114 to capture images of their surroundings. In some examples, control circuitry, e.g., control circuitry 218, may be configured to track one or more eye movements of the first user 110 as the first user 110 operates the first user device 114 to capture the series of images 802, 804 and 806. For example, control circuitry may determine that the first user 110 eyes are looking in a first direction at the instant image 818 was captured, a second direction at the instant image 808 was captured, and a third direction at the instant image 820 was captured. In particular, control circuitry may determine that the first user's 110 eyes are moving from right to left as images 818, 808 and 820 are captured in sequence. In response to determining a change in the gaze of the first user 110, control circuitry may be configured to compare a change in the gaze of the first user 110 to a change in the relative position of an element in each of the captured images 808, 818 and 820. FIG. control circuitry may determine that the change in direction of the user's gaze, e.g., from right to left, corresponds to a change in the position of element 816 in each of the captured images 808, 818 and 820, e.g., from left to right of the image. In such a case, control circuitry may positively determine that 816 is a transient element since its position changes relative to other elements of an image and that the user's gaze indicates interest in that element, e.g., by virtue of the user's gaze following the classic New York style taxi as it drives the road junction.

At 624, control circuitry e.g., control circuitry 210, tags element 816 as a transient element. Process 600 then moves to 628, and optionally 626.

At 626, in response to element 816 receiving a transient element tag, control circuitry may be configured to monitor the transient element. For example, control circuitry may be configured to cause one or more additional images containing the transient element (not shown) to be captured by the first user device 110. In this manner, one or more alternative views of the content of the transient element may be captured. For example, where the first user 110 ceases to look at the taxi as it drives by, one or more further images containing the taxi may be captured, e.g., for use later in process 600, such as at 656 and/or 658.

At 628, control circuitry, e.g., control circuitry 210, determines a first location associated with the first image 808. At 630, control circuitry determines a second location associated with the second image 908. Locations of the respective images may be determined in any appropriate manner, such as that described above under 304. FIG. 7 shows a map 700 of New York indicating a first marker 702 indicating a first location at which, or near to which, the first image 808 was captured, and a second marker 704 indicating a second location at which, or near to which, the second image 908 was captured.

At step 632, control circuitry, e.g., control circuitry 210, determines a travel time between the first and second locations, and determines whether the travel time is below a predetermined threshold travel time, e.g., 5-10 minutes or 15-30 by foot and/or another mode of transportation. Where the determined travel time is greater than the threshold travel time, process 600 moves to 612 (see arrow C). For example, when it is determined that the second location is far from the first location, control circuitry may be instructed to not provide a notification at the second user device that a shared transient event is available, e.g., by virtue of the location at which the transient event occurred being too far from the second user device 116, e.g., at the moment when the second image 908 was captured. Where the determined travel time is less than or equal to the threshold travel time, process 600 moves to 640. For example, when it is determined that the second location is near to the first location, control circuitry may be instructed to provide a notification at the second user device that a shared transient event is available, e.g., by virtue of the location at which the transient event occurred being close to the second user device 116, e.g., at the moment when the second image 908 was captured. In some examples, the travel time between the first and second locations may be greater than a predetermined threshold travel time at the moment when the second image 908 was captured (e.g., no notification sent). However, control circuitry may be configured to monitor a current location of the second user device 116 relative to the first location 702, and issue a notification at the second user device 116 when a travel time between a current location of the second user device 116 and the first location 702 is less than the threshold travel time. In some examples, if multiple notifications are generated around the same time, e.g., based on the actions of one or more other users (a third and/or fourth user, etc), the multiple notifications may be grouped and/or ranked by an interest level of the second user 112 and/or the proximity of the second user 112 to the first location 702.

At 640, control circuitry, e.g., control circuitry 210, generates instructions 706 to navigate from the second location 704 (or a current location of the second user device 116) towards the first location 702.

At 642, control circuitry, e.g., control circuitry 218, receives navigational instructions at the second user device 116. In the example shown in FIG. 7, the travel time between the two locations is 6 mins by foot.

At 644, control circuitry, e.g., control circuitry 218, determines the location of the second user device 116 as the second user device 116 moves towards the first location 702 along route 706, e.g., using a GPS module of the second user device 116, and/or any other appropriate method. In some examples, control circuitry 218 of the second user device 116 may send location data to control circuitry 210 of server 204.

At 646, control circuitry, e.g., control circuitry 210, determines whether the distance between the second user device 116 and the first location 702 less than a threshold distance, e.g., a third location 708, indicated by dashed circle 710 on FIG. 7. In some examples, the threshold distance may be set at a few meters, e.g., 5 meters, or a larger distance, such as 100 meters, or a couple of blocks. In any case, the threshold distance is used to determine whether the second user device 116 is close enough to the first location 702 for the second user 112 to be able to experience, virtually, the transient event witnessed by the first user 110. When the second user device 116 is not within the threshold distance, process 600 repeats 644 and 646. When the second user device 116 is within the threshold distance, process 600 moves to 648. In some examples, when the second user device 116 is within the threshold distance, a notification is sent to the second user device 116 to inform the second user 112.

At 648, control circuitry, e.g., control circuitry 218, captures a third image 1002 using the second user device 116, e.g., automatically or based on user instruction. In some examples, the third image 1002 may be sent to control circuitry 210 for analysis and/or analysis may be performed locally on the second user device 116.

At 650, control circuitry, e.g., control circuitry 210, determines a first set of elements 1010 in the third image 1008, e.g., in a manner similar to that carried out under 304, 308, and/or 608. In the example shown in FIG. 10A, the third image 1008 has a first element 1012 containing a partial view of the Empire State Building and a second element 1014 containing a sign for Dunkin' Donuts.

At step 652, control circuitry, e.g., control circuitry 210, determines an orientation of the first user device 114 when capturing the first image 808. In some examples, the angular orientation of the first user device 114 may be determined using one or more sensors, e.g., accelerometers, of the first user device 114. In some examples, information relating to the orientation, e.g., the angular orientation, of the first user device 114 may be generated by the first user device 114 when capturing the first image 808. Such information may be stored as metadata relating to the first image 808.

At step 654, control circuitry, e.g., control circuitry 210, determines an orientation of the second user device 116 when capturing the third image 1008, e.g., in a manner similar to that described at 652.

At 656, control circuitry, e.g., control circuitry 210, determines whether the difference between the orientation of the first user device 114 and the orientation of the second user device 116 greater than an orientation threshold. For example, the orientation threshold may be set to an angular range, such as +/−5 degrees from one or more reference planes and/or directions. When the difference between the orientation of the first user device 114 and the orientation of the second user device 116 is less than or equal to the orientation threshold, process 600 moves to 662. When the difference between the orientation of the first user device 114 and the orientation of the second user device 116 is greater than the orientation threshold, process 600 moves to 658 (and/or 660). In the example shown in shown in FIG. 10A, the orientation of the second user device is not within the limits of the orientation threshold, which is evident at least by element 1012 not containing the top part of the Empire State Building. In some examples, 656 may be performed in parallel with, or as part of, 646. For example, the second user device 116 may perform simultaneous localization and mapping (SLAM), e.g., based on the second user's location (e.g., determined from a GPS signal of the second user device 116) as well as the second user's orientation (e.g., determined from a current image captured by a camera of the second user device 116 and a map of the environment).

At 658, control circuitry generates 1020 instructions, e.g., for display at the second user device 116, regarding how to re-orientate the second user device 116 such that its current orientation more closely matches the orientation of the first user device 114 when the first image 808 was captured. In some examples, the third image 1002 may be displayed on a screen of the second user device 116 along with an inlay 1030 illustrating an image 1032 resulting from a desired orientation of the second user device 116. In the example shown in FIG. 10A, instructions 1020 are provided in inlay 1030. Additionally or alternatively, instructions may be provided in any appropriate manner, such as by virtue of a set of audio statements. In some examples, process 600 comprises a feedback loop from 658 to 656 to maintain the generation of instructions until the orientation of the second user device 116 is within the orientation threshold. When the orientation of the second user device 116 is within the orientation threshold, process 600 moves to 662.

At 660, as well as or instead of providing instructions to re-orientate the second user device 116, control circuitry may modify a representation of the transient element so that it better suits the third image 1008 captured at the current orientation of the second user device 116. For example, in some cases, a direct copy of the transient element may not suit the third image 1008 captured at the current orientation of the second user device 116, e.g., as a result of the third image containing one or more elements not present in the first image 808, and/or the second user 116 simply not being able to replicate the orientation of the first user device 114 when the first image 808 was captured. Modification of the representation of the transient element may comprise performing one or more transformations on the content of the transient element 816 of the first image 808. In some examples, one or more of the additional images of the content of the transient element, e.g., images of the taxi, captured at 626 may be used to modify the representation of the transient element (see arrow B). For example, an additional image of the taxi may be used where a perspective view of the taxi in the additional image better matches the perspective achieved by the orientation of the second user device 114.

At 662, control circuitry causes a representation 1040 of the transient element 816 to be overlaid on to the third image 1008, e.g., in a manner similar to that described under 314 above.

As a result of the above process, the second user 112 has been altered of and guided to a location where a first user experienced a transient event (e.g., an event of interest). Furthermore, the second user 112 has been instructed on how to position and orient the second user device 116 so as to best replicate the transient event witnessed by the first user 110. In the example described in FIGS. 6A to 10B, the second user 112 is able to witness, as the second user shares the experience of walking around New York, a virtual copy of the transient event captured by the first user device 114 when the first user 110 was walking around New York. However, in other examples, the second user may experience a virtual copy of the transient event when experiencing a virtual tour of the city. For example, the virtual transient event may be incorporated into a virtual representation of New York for the second user to experience at any time.

The actions or descriptions of FIGS. 6A to 10B may be used with any other example of this disclosure. In addition, the actions and descriptions described in relation to FIGS. 6A and 6B may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, using control circuitry, a first image captured at a first location using a first user device of a first user;
determining, using the control circuitry, a first set of elements of the first image;
receiving, using the control circuitry, a second image captured at a second location using a second user device of a second user;
determining, using the control circuitry, a second set of elements of the second image;
determining, using the control circuitry, that at least one element of the first set of elements corresponds to at least one element of the second set of elements;
determining, using the control circuitry, that a transient element is present in the first set of elements of the first image and is not present in the second set of elements of the second image;
determining whether a projected travel time between the second location and the first location is less than a threshold travel time;
in response to determining that the projected travel time between the second location and the first location is less than the threshold travel time, generating a notification regarding a proximity of the second user of the second device to the first location associated with the transient element, and causing the notification to be displayed on the second user device; and
causing display, using the control circuitry, of the transient element on the second user device.

2. The method of claim 1, wherein the second user device is an augmented reality device and causing the display of the transient element on the second user device comprises:
overlaying the transient element of the first image onto the second image to provide an augmented reality experience.

3. The method of claim 2, further comprising:
determining a difference between the first set of elements of the first image and the second set of elements of the second image; and
modifying the transient element when overlaying the transient element onto the second image based on the determined difference.

4. The method of claim 1, wherein the second image is captured at a first time-interval after the first image was captured.

5. The method of claim 1, further comprising:
receiving at least one further image captured by the first user device, the at least one further image being captured at a second time-interval before or after the first image was captured;
determining a further set of elements of the further image; and
identifying the transient element by comparing relative positions between the elements in the first set of elements and relative positions between the elements in the further set of elements.

6. The method of claim 5, further comprising:
determining a gaze of the first user operating the first user device when capturing the first image;
determining a gaze of the first user operating the first user device when capturing the at least one further image;
determining a change in the gaze of the first user between capturing the first image and the at least one further image; and
identifying the transient element based on the change in the gaze of the user.

7. The method of claim 1, further comprising:
determining the first location at which the first image was captured; and
determining the second location at which the second image was captured;
wherein generating the notification in response to determining that the projected travel time between the second location and the first location is less than the threshold travel time further comprises:
  generating navigational instructions to navigate from the second location towards the first location; and
wherein causing the notification to be displayed on the second user device in response to determining that the projected travel time between the second location and the first location is less than the threshold travel time further comprises:
  causing the navigational instructions to be displayed at the second user device.

8. The method of claim 1, further comprising:
determining a location of the second user device as the second user device moves towards the first location;
receiving a third image captured using the second user device;
wherein causing the display of the transient element on the second user device comprises:
  overlaying the transient element of the first image onto the third image when the location of the second user device is within a predetermined threshold distance from the first location.

9. The method of claim 8, further comprising:
determining an orientation of the first user device when capturing the first image;
determining an orientation of the second user device when capturing the third image; and
determining a difference between the orientation of the first user device and the orientation of the second user device;
wherein overlaying the transient element of the first image onto the third image comprises:
  modifying the transient element based on the difference between the orientation of the first user device and the orientation of the second user device.

10. The method of claim 1, further comprising:
in response to determining that the projected travel time between the second location and the first location is less than the threshold travel time, declining to generate, and cause display on the second device of, the notification.

11. A system comprising:
computer memory;
control circuitry configured to:
  receive a first image captured at a first location using a first user device of a first user, wherein the first image is stored in the computer memory;
  determine a first set of elements of the first image;
  receive a second image captured at a second location using a second user device of a second user;
  determine a second set of elements of the second image;
  determine that at least one element of the first set of elements corresponds to at least one element of the second set of elements;
  determine that a transient element is present in the first set of elements of the first image and is not present in the second set of elements of the second image;
  determine whether a projected travel time between the second location and the first location is less than a threshold travel time;
  in response to determining that the projected travel time between the second location and the first location is less than the threshold travel time, generate a notification regarding a proximity of the second user of the second device to the first location associated with the transient element, and cause the notification to be displayed on the second user device; and
  cause display of the transient element on the second user device.

12. The system of claim 11, wherein the second user device is an augmented reality device and the control circuitry is configured to, when causing the display of the transient element on the second user device, overlay the transient element of the first image onto the second image to provide an augmented reality experience.

13. The system of claim 12, wherein the control circuitry is configured to:
determine a difference between the first set of elements of the first image and the second set of elements of the second image; and
modify the transient element when overlaying the transient element onto the second image based on the determined difference.

14. The system of claim 11, wherein the second image is captured at a first time-interval after the first image was captured.

15. The system of claim 11, wherein the control circuitry is further configured to:
receive at least one further image captured by the first user device, the at least one further image being captured at a second time-interval before or after the first image was captured;
determine a further set of elements of the further image; and
identify the transient element by comparing relative positions between the elements in the first set of elements and relative positions between the elements in the further set of elements.

16. The system of claim 15, wherein the control circuitry is further configured to:
determine a gaze of the first user operating the first user device when capturing the first image;
determine a gaze of the first user operating the first user device when capturing the at least one further image;
determine a change in the gaze of the first user between capturing the first image and the at least one further image; and
identify the transient element based on the change in the gaze of the user.

17. The system of claim 11, wherein the control circuitry is further configured to:
determine the first location with which the first image was captured;
determine the second location at which the second image was captured;
generate the notification in response to determining that the projected travel time between the second location and the first location is less than the threshold travel time further by generating navigational instructions to navigate from the second location towards the first location; and
causing the notification to be displayed on the second user device in response to determining that the projected travel time between the second location and the first location is less than the threshold travel time by receiving the navigational instructions at the second user device.

18. The system of claim 11, wherein the control circuitry is further configured to:
   determine a location of the second user device as the second user device moves towards the first location; and
   receive a third image captured using the second user device;
   wherein the control circuitry is configured to, when causing the display of the transient element on the second user device, overlay the transient element of the first image onto the third image when the location of the second user device is within a predetermined threshold distance from the first location.

19. The system of claim 18, wherein the control circuitry is further configured to:
   determine an orientation of the first user device when capturing the first image;
   determine an orientation of the second user device when capturing the third image; and
   determine a difference between the orientation of the first user device and the orientation of the second user device;
   wherein the control circuitry is further configured to:
      modify the transient element based on the difference between the orientation of the first user device and the orientation of the second user device, when overlaying the transient element of the first image onto the third image.

20. The system of claim 11, wherein the control circuitry is further configured to:
   in response to determining that the projected travel time between the second location and the first location is less than the threshold travel time, declining to generate, and cause display on the second device of, the notification.

* * * * *